(12) United States Patent
Lunsford

(10) Patent No.: US 6,356,442 B1
(45) Date of Patent: Mar. 12, 2002

(54) ELECTRONICALLY-ENABLED ENCASEMENT FOR A HANDHELD COMPUTER

(75) Inventor: E. Michael Lunsford, San Carlos, CA (US)

(73) Assignee: Palm, Inc, Santa Clara, CA (US)

( * ) Notice: Subject to any disclaimer, the term of this patent is extended or adjusted under 35 U.S.C. 154(b) by 0 days.

(21) Appl. No.: 09/573,451

(22) Filed: May 16, 2000

Related U.S. Application Data

(63) Continuation-in-part of application No. 09/502,169, filed on Feb. 11, 2000, now Pat. No. 6,266,240, and a continuation-in-part of application No. 09/451,630, filed on Nov. 30, 1999, and a continuation-in-part of application No. 09/271,057, filed on Mar. 16, 1999, and a continuation-in-part of application No. 09/244,440, filed on Feb. 4, 1999, and a continuation-in-part of application No. 09/246,781, filed on Feb. 4, 1999, and a continuation-in-part of application No. 09/244,613, filed on Feb. 4, 1999.

(51) Int. Cl.[7] ................................................ G06F 1/16
(52) U.S. Cl. .................... 361/686; 361/754; 312/223.2; 345/179
(58) Field of Search .......................... 361/686, 680–683, 361/725–727, 741, 756; D6/396, 397; D14/100, 114; 312/223.2, 223.6; 345/179, 173

(56) References Cited

U.S. PATENT DOCUMENTS

| 4,559,705 A | 12/1985 | Hodge et al. ................. 33/1 B |
| 5,040,296 A | 8/1991 | Yerger ............................ 30/81 |
| 5,049,862 A | 9/1991 | Dao et al. .................... 340/706 |
| 5,128,829 A | 7/1992 | Loew ........................... 361/380 |
| 5,165,415 A | 11/1992 | Wallace et al ......... 128/661.06 |
| 5,205,017 A | 4/1993 | Wang ............................ 16/367 |
| 5,253,142 A | 10/1993 | Weng ........................... 361/680 |
| 5,430,248 A | 7/1995 | Levy ............................ 174/50 |
| D366,463 S | 1/1996 | Ive et al. ..................... D14/100 |
| 5,489,924 A | 2/1996 | Shima et al. ................. 345/173 |
| D368,079 S | 3/1996 | Ive et al. ..................... D14/114 |
| 5,548,477 A | 8/1996 | Kumar et al. ................ 361/680 |
| 5,555,157 A | 9/1996 | Moller et al. ................ 361/683 |
| 5,622,789 A * | 4/1997 | Young ............................ 429/7 |
| 5,638,257 A | 6/1997 | Kumar et al. ................ 361/680 |
| 5,810,461 A | 9/1998 | Ive et al. ................... 312/223.6 |
| 5,821,510 A | 10/1998 | Cohen et al. ................ 235/375 |
| 5,831,613 A | 11/1998 | Johnston et al. ............. 345/339 |
| 5,848,298 A | 12/1998 | Steere, Jr. et al. ........... 395/882 |
| 5,889,512 A | 3/1999 | Moller et al. ................ 345/179 |
| 5,941,648 A * | 4/1999 | Robinson et al. .............. 400/82 |
| 5,914,708 A | 6/1999 | LaGrange et al. ........... 345/179 |
| 5,996,956 A | 12/1999 | Shawver ................... 248/309.1 |
| 6,032,866 A | 3/2000 | Knighton et al. ............ 235/492 |
| D426,236 S | 6/2000 | Kim et al. ................... D14/345 |
| 6,108,200 A | 8/2000 | Fullerton ..................... 361/686 |
| 6,115,248 A * | 9/2000 | Canova et al. .............. 361/686 |
| 6,129,430 A | 10/2000 | Wu ........................... 312/223.2 |
| 6,178,087 B1 | 1/2001 | Cho et al. .................... 361/686 |
| 6,181,284 B1 * | 1/2001 | Madsen et al. .............. 343/702 |
| 6,239,968 B1 * | 5/2001 | Kim et al. ................... 361/679 |

* cited by examiner

Primary Examiner—Leo P. Picard
Assistant Examiner—Hung Van Duong
(74) Attorney, Agent, or Firm—Hickman Palermo Troung & Becker LLP; Van Mahamedi

(57) ABSTRACT

An electronically-enabled encasement for a handheld computer is provided. The encasement includes an encasement portion configured to cover at least a portion of the handheld computer, including a front surface of the handheld computer providing access to a display; a spine engageable with an accessory slot of the handheld computer to detachably couple the encasement with the handheld computer; a connector to electronically connect the encasement to the handheld computer; and at least one electronic component embedded in the encasement portion. The encasement may also include a wireless communication port such a radio frequency transmitter or an IR transceiver.

38 Claims, 14 Drawing Sheets

ELECTRONICALLY-ENABLED ENCASEMENT FOR A HANDHELD COMPUTER

CROSS REFERENCE TO RELATED APPLICATIONS

This application is a continuation-in-part of application Ser. No. 09/502,169, filed Feb. 11, 2000, entitled "Encasement For a Handheld Computer" now U.S. Pat. No. 6,266,240 dated Jul. 24, 2001, application Ser. No. 09/451,630, filed Nov. 30, 1999, entitled "Cover For A Handheld Computer" application Ser. No. 09/271,057, filed Mar. 16, 1999, entitled "Dual Action Stylus For A Handheld Computer," application Ser. No. 09/244,440, filed Feb. 4, 1999, entitled "Handheld Computer" application Ser. No. 09/246,781, filed Feb. 4, 1999, entitled "Handheld Computer" and application Ser. No. 09/244,613, filed Feb. 4, 1999, entitled "Handheld Computer" all of which are hereby incorporated by reference for this application.

BACKGROUND OF THE INVENTION

1. Field of the Invention

This invention relates to the field of handheld computers. In particular, the invention relates to a protective encasement for a handheld computer.

2. Description of the Related Art

Handheld computers, including personal digital assistants and palm-sized computers, provide the user with a wide variety of functions, such as a calendar, an address book, a task list, a notepad, and a calculator. These handheld computers may be approximately the size of a stack of 3"×5" index cards, sufficiently compact to fit into a shirt pocket.

Current handheld computers, such as the PalmPilot® from Palm, Inc., typically have a housing, which consists of a mating front shell and back shell, which are coupled to each other with screws. The front shell and back shell enclose the components of the handheld computer. Typically, a main board is mounted on one of the shells.

The housing or casing of the handheld computer typically includes a slot for a retaining a stylus or writing device.

Handheld computers also typically include a display and one or more application buttons on a front surface. The display may be a touch-screen to accept entry from a stylus or pointer device.

Handheld computers can be housed in an encasement to protect the device while it is in use or as it is carried between locations. The encasement helps to protect the handheld computer in case it is dropped or otherwise put in harm's way. However, such a protective encasement by its nature covers up the handheld computer's synchronization serial port which is typically used for attachment of electronic peripherals. Thus, these encasements prohibit the simultaneous attachment and use of such electronic peripherals.

When electronic peripherals are attached to such handheld computers, typically to the bottom or the back of the handheld computer, the overall size of the system is increased. With bulkier sizes, these handheld computers plus peripherals become much less "pocket-friendly", i.e., harder to be fitted into a regular shirt pocket. Moreover, as the size of the system increases with more external peripherals loaded onto the handheld computer, the form factor of the system becomes larger, causing it harder to accommodate the whole system within a user's palm or pocket.

SUMMARY OF THE INVENTION

The present invention provides electronically-enabled encasements for handheld computers. The encasement can be used to attach a variety of electronic peripherals to the handheld computer, as well as to protect the handheld computer from environmental elements. In particular, a radio frequency (RF)-enabled encasement according to the present invention can be used to enhance and expand efficient wireless communication of the handheld computer with a wide range of computing and telecommunications devices without appreciably increasing the size or reducing the protective characteristics of a typical encasement.

In one embodiment, an electronically-enabled encasement for a handheld computer is provided. The encasement comprises: an encasement portion configured to cover at least a portion of the handheld computer, including a front surface of the handheld computer providing access to a display; a spine engageable with an accessory slot of the handheld computer to detachably couple the encasement with the handheld computer; and at least one electronic component embedded in the encasement portion.

According to this embodiment, the spine may be slideably engageable with an accessory slot of the handheld computer. When the spine is engaged to the handheld computer, the encasement portion is dimensioned to encase the handheld computer so as to protect the computer from environmental elements.

Also according to the embodiment, the encasement includes a connector capable of mating with a serial connector of the handheld computer to allow communication between the electronic component and the handheld computer. The connector may be a wiping-style connector, a pogo-style connector or a dual style connector. The encasement may also include circuitry in the encasement for connecting the connector to the electronic component of the handheld computer.

The encasement of the present invention may be a single-cover encasement for the display surface of the handheld computer. When the spine is coupled to an accessorial slot of the handheld computer, the cover of the encasement covers the display surface of the computer. The handheld computer encased by such an encasement may be directly connected to a communication cradle without having the encasement removed first.

Alternatively, the encasement may be a dual-cover encasement consisting of two portions, a front portion that is extendable over the display surface of the handheld computer, and a back portion that is extendable over the back surface of the handheld computer.

According to this variation, the encasement may include a joint to movably joint the front portion to the back portion. The joint may be formed from a flexible material such as leather or rubber. The flexible material enables the front portion to wrap around and allows the exterior surface of the front portion to contact an exterior surface of the back portion. Alternatively, the joint may be a wrap-around hinge that enables the front portion to wrap around the back portion. Because the back portion can be wrapped around the front portion, the handheld computer encased by such an encasement may be directly connected to a communication cradle through a connector in the back surface of the computer without having the encasement removed first.

Also according to the variation, the electronic component may be embedded in the front portion of the encasement portion.

Also according to the variation, the encasement further comprises a connector that is embedded in the back portion of the encasement and is capable of mating with a serial connector of the handheld computer to extend communication of the handheld computer to the electronic component. In this case, the encasement may further comprise a second, pass-through connector accessible from a back surface of the back portion of the encasement to mate with another connector of an accessory device. The second connector enables the handheld computer to synchronize with another computer when the encasement is coupled to the handheld computer. The encasement processor may also include a processor capable of executing synchronization functions.

Also according the variation, the encasement of claim 11, further comprises a locking mechanism. The locking mechanism couples the back portion of the encasement portion with the handheld computer to secure stable mating between the connector in the encasement and the serial connector of the handheld computer.

Optionally, the encasement of claim 5, further comprises a mechanical coupling that enables the front portion and the back portion to be retained in a closed position. The mechanical coupling may be any kind of coupling mechanism available in the art, such as a male velcro element positioned on the front or the back portion and a female velcro element positioned on the other of the front and the back portions.

According to the embodiment, the electronic component may be a wide variety of electronic peripherals such as wireless modems, voice recorders, digital cameras, keyboards, cell phones, solar cells, rechargeable battery, GPS systems, rechargers, memories, connectors for multi-media cards, memory sticks, accessory cartridges, compact flash cards and phone cards.

Also according to the embodiment, the encasement may preferably include a radio frequency communication component. The radio frequency communication component may preferably be adapted to operate in a Bluetooth medium. The RF-enabled encasement may also preferably include an RF antenna.

Also according to the embodiment, the encasement may include memory which may be used for storing information for the handheld computer.

In another embodiment of the present invention, an RF-enabled encasement for a handheld computer is provided. The encasement comprises: an encasement portion configured to at least a portion of the handheld computer, including a front surface of the handheld computer providing access to a display and a back surface; a spine engageable with an accessory slot of the handheld computer to detachably couple the encasement with the handheld computer; a radio frequency mechanism embedded in the encasement portion; and a connector that extends communication between the radio frequency mechanism and the handheld computer. According to this embodiment, the encasement may also include an RF antenna embedded in the encasement portion;

In yet another embodiment, an electronically-enabled encasement for a handheld computer is provided. The encasement comprises: an encasement portion configured to cover at least a portion of the handheld computer; and a communication port on the encasement that extends communications through another communication port of the handheld computer to the handheld computer.

According to the embodiment, the encasement further comprises a coupling engageable with the handheld computer to detachably couple the encasement with the handheld computer. For example, the coupling may be a spine which is engageable with an accessory slot of the handheld computer to detachable couple the encasement to the handheld computer. Alternatively, the coupling may snugly fit the handheld computer with the encasement.

According to the embodiment, the communication port of the encasement may be a connector capable of mating with a serial connector of the handheld computer to extend communication to the handheld computer.

Alternatively, a cable may be utilized to connect the communication portion on the encasement to the handheld computer.

The communication port may be a serial port, an infrared port, a radio frequency port, or a combination thereof.

Also according to the embodiment, the encasement has least one electronic component embedded in the encasement portion. Examples of electronic components include, but are not limited to, wireless modems, voice recorders, digital cameras, keyboards, cell phones, solar cells, rechargeable batteries, GPS systems, rechargers, memories, connectors for multi-media cards, memory sticks, accessory cartridges, compact flash cards and phone cards. In this variation, connector of the encasement may be a serial connector capable of mating with another serial connector of the handheld computer to extend communication of the electronic component to the handheld computer.

The present invention also provides a novel method for attaching electronic peripherals to a handheld computer. The method comprises: providing an encasement which comprises an encasement portion configured to at least a portion of the handheld computer, including a front surface of the handheld computer providing access to a display and a back surface, a spine slidably engageable with an accessory slot of the handheld computer to detachably couple the encasement with the handheld computer, an RF antenna embedded in the encasement portion, a plurality of electronic peripherals embedded in the encasement portion, and a connector that extends communication of the electronic component to the handheld computer; and sliding the spine into an accessory slot of the handheld computer.

BRIEF DESCRIPTION OF THE FIGURES

FIG. 1A is a frontal view of the handheld computer.

FIG. 1B is an exploded isometric view showing components of the handheld computer, under an embodiment of the invention.

FIG. 1C is a top view of the handheld computer illustrating a housing of the handheld computer, under an embodiment of the invention.

FIG. 1D is a side view of the handheld computer illustrating the housing and an accessorial slot under an embodiment of the invention.

FIG. 2A is a frontal view of a first surface of the cover.

FIG. 2B is a frontal view of a second surface of the cover.

FIG. 2C is an isometric view of the cover coupled to the handheld computer.

FIG. 3A shows the encasement in the opened position.

FIG. 3B shows the encasement with its spine engaging with an accessory slot of a handheld computer.

FIG. 3C is a frontal view of the encasement in the closed position.

FIG. 3D is a side-view of the closed encasement encasing a handheld computer.

FIG. 3E is a rear view of the closed encasement including a connector in the back portion of the encasement, under a variation of the embodiment.

FIG. 3F is a top view of the encasement in the closed position.

FIG. 3G is a bottom view of the encasement.

FIG. 3H is a bottom surface of the encasement.

DETAILED DESCRIPTION OF THE INVENTION

Embodiments of the invention include an electronically-enabled encasement for a handheld computer. In one embodiment, the encasement comprises: an encasement portion configured to cover at least a portion of the handheld computer, including a front surface of the handheld computer providing access to a display; a spine engageable with an accessory slot of the handheld computer to detachably couple the encasement with the handheld computer; and at least one electronic component embedded in the encasement portion.

The encasement of the present invention may be a single-cover encasement covering the display side of the handheld computer. When the spine is coupled to an accessory slot of the handheld computer, the cover of the encasement covers the display surface of the computer. Alternatively, the encasement may consist of two portions, a front portion that is extendable over the display surface of the handheld computer, and a back portion that is extendable over the back surface of the handheld computer.

The encasement can be used to attach a variety of electronic peripherals to the handheld computer, as well as to protect the handheld computer from environmental elements. In particular, a radio frequency (RF)-enabled encasement according to the present invention can be used to enhance and expand efficient wireless communication of the handheld computer with a wide range of computing and telecommunications devices.

1. System Overview

Figure 1A:
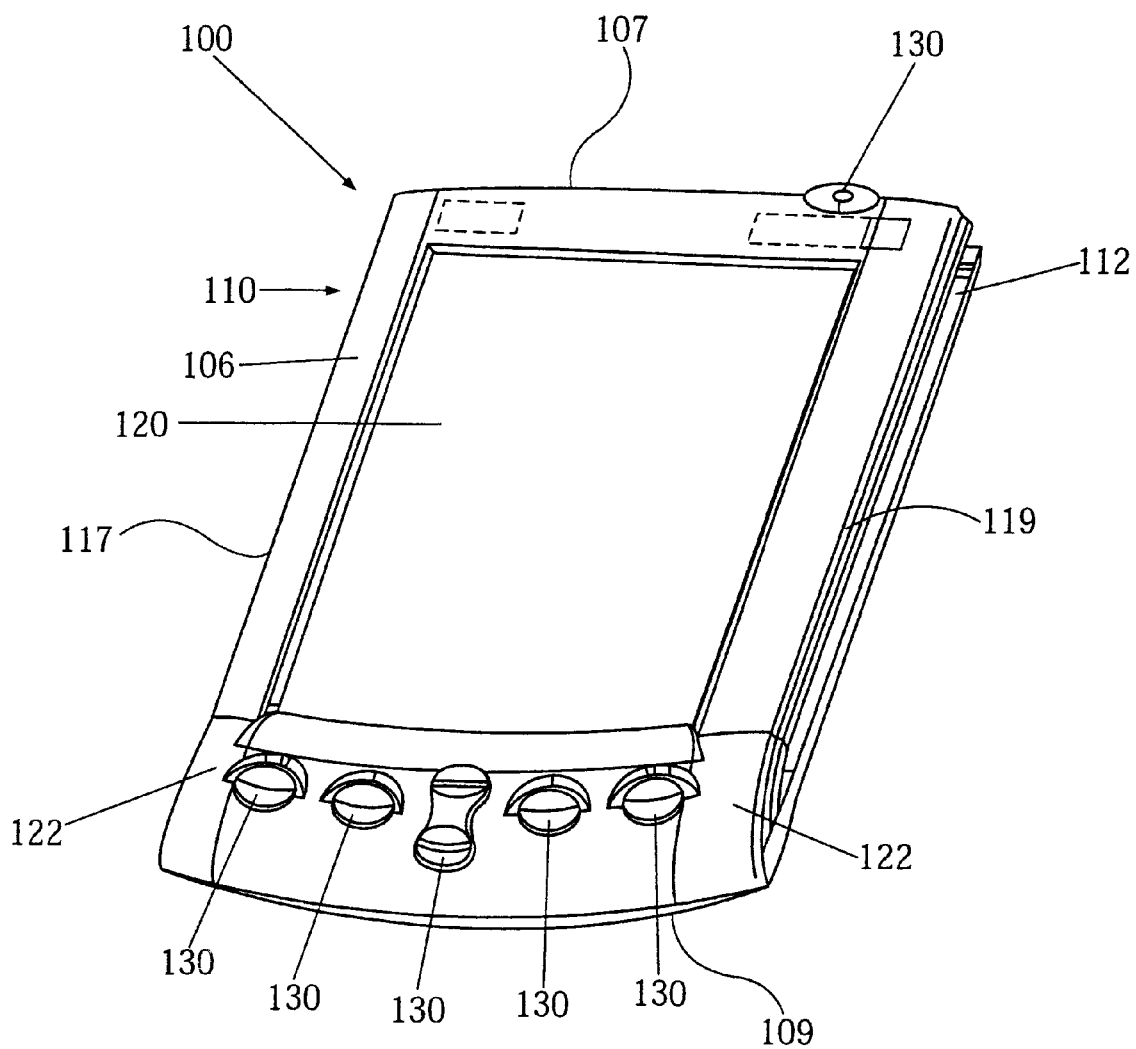
FIGS. 1A–1D illustrate a handheld computer, under an embodiment of the invention.

FIG. 1A is an exploded view of a handheld computer 100 under an embodiment of the invention. A typical handheld computer is used to maintain calendars, to-do lists, contacts and memos. Examples of handheld computers for use with embodiments of this invention include any one of the PalmPilot™, Palm III™, Palm V™, and Palm VII™ organizers, manufactured by Palm Inc. Other embodiments of the invention can include Windows CE™ portable computers, or other handheld computers and personal digital assistants.

The handheld computer 100 includes a housing 110 having a top end 107, a bottom end 109, and lateral sides 117, 119. A user-interactive display 120 is provided on a front side 106 of the handheld computer 100. A plurality of application buttons 130 are accessible through the housing 110 at a portion below the display 120. The housing 100 includes a rectangular shape with a flared bottom portion 122.

Figure 1B:
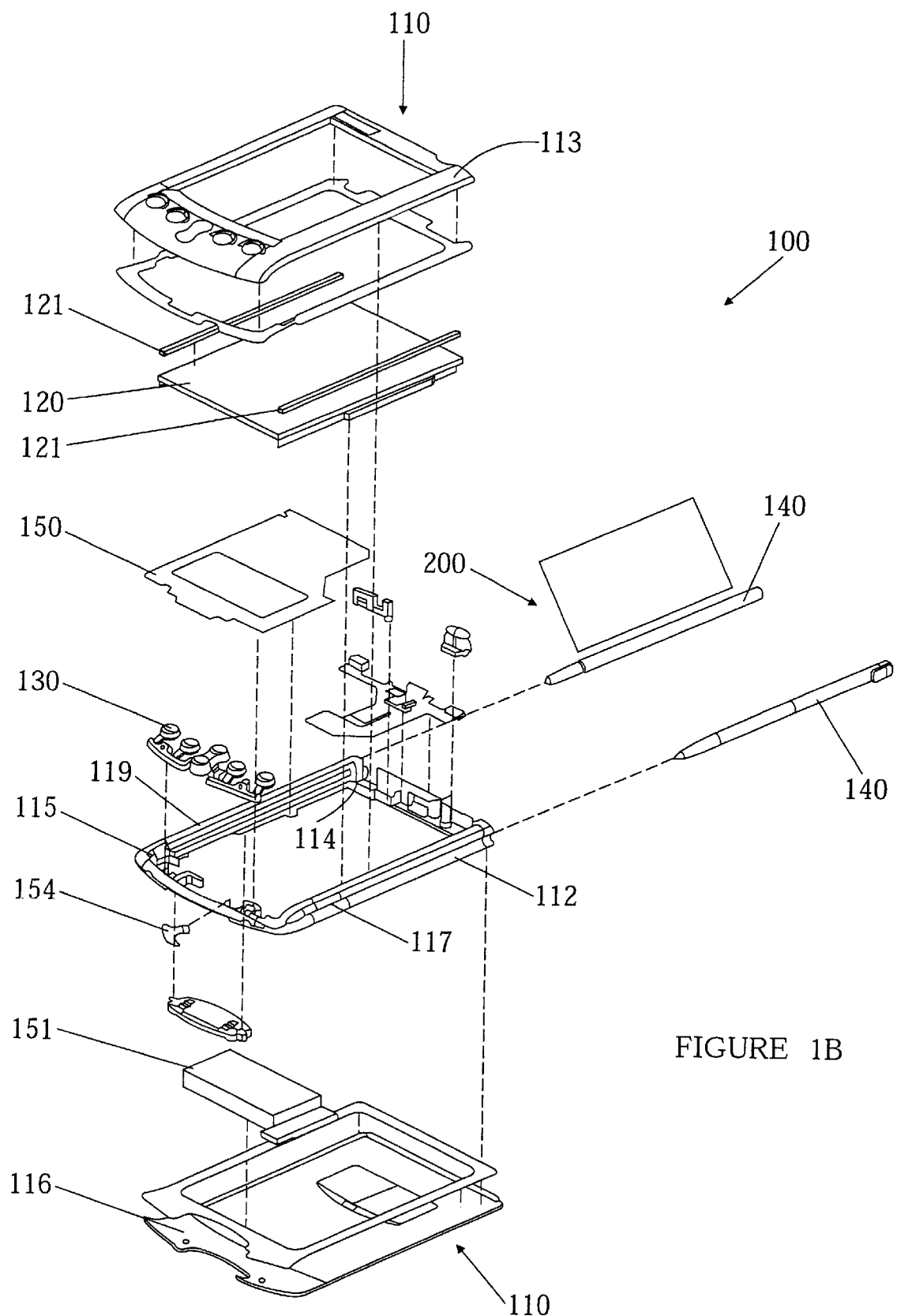
Figure 2A:
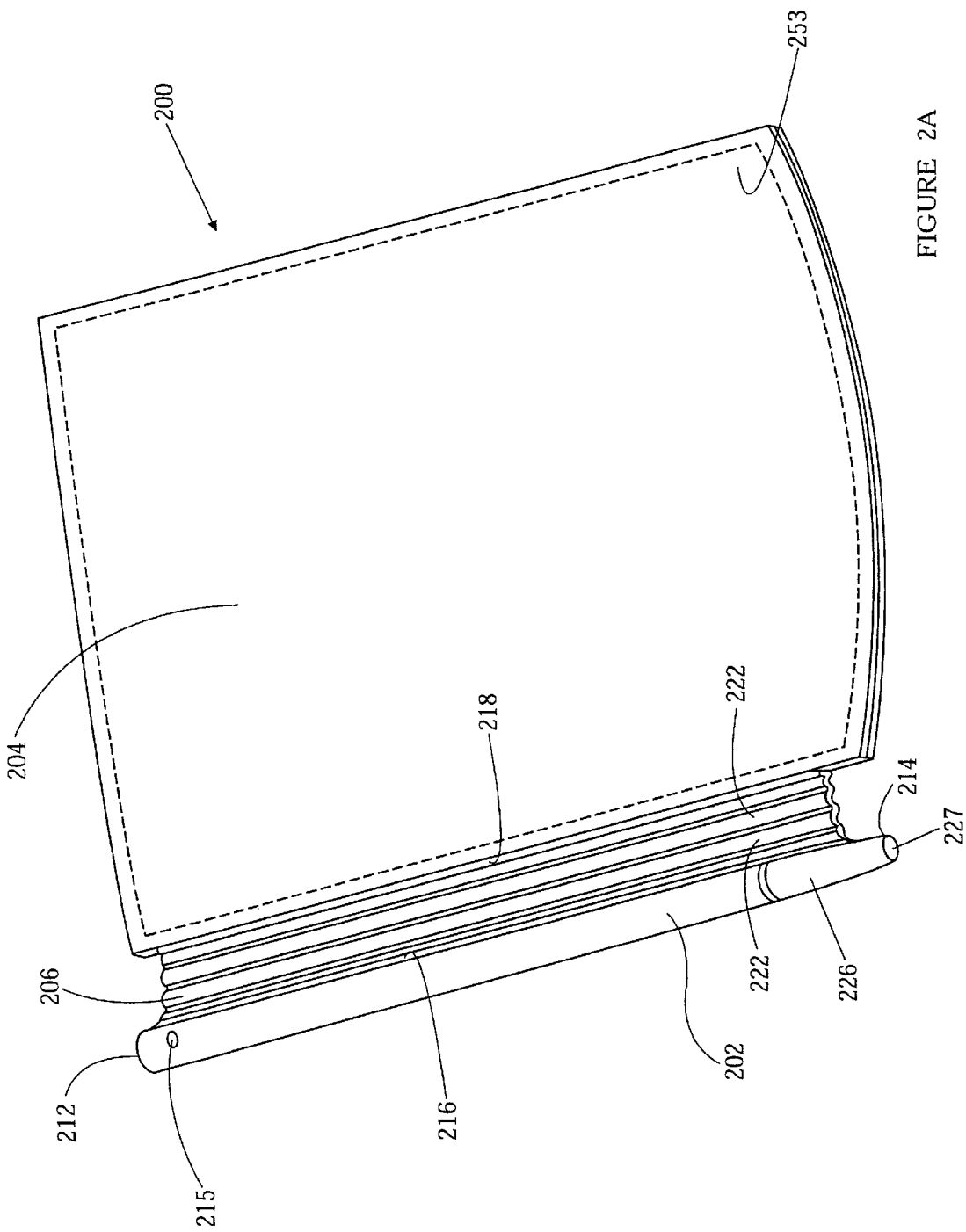
FIGS. 2A–C illustrates a cover with an electronic component embedded within, under an embodiment of the invention.

The handheld computer 100 includes one or more accessorial slots. Each accessorial slot is adapted to receive an accessory device. In an embodiment, a first and second accessorial slot 112, 114 (FIG. 1B) are provided on each lateral side 117, 119 of the housing 110. Each accessorial slot 112, 114 may be formed into the midframe 115 (FIG. 1B). Preferably, the accessorial slots 112, 114 are elongated and cylindrical to receive a stylus 140 (FIG. 1B). Each of the accessorial slots 112, 114 may retain stylus 140 for intermittent use with the handheld computer 100. As will be further described, one of the accessorial slots 112, 114 is also used under an embodiment to receive and retain a peripheral portion of the cover 200 (FIG. 2A).

FIG. 1B is an exploded isometric view of the handheld computer 100. The housing 110 includes a midframe 115 sandwiched between a front shell 113 and a back shell 116. The front shell 113, back shell 116, and one or more surfaces of midframe 115 combine to form a periphery of handheld computer 100. Midframe 115 may be molded or otherwise formed to match dimensions of front shell 113 and back shell 116. Midframe 115 may be partially enclosed by one or both of front shell 114 and back shell 116. The front shell 113, back shell 116 and midframe 115 combine to enclose and protect the internal components of the handheld computer 100. Midframe 115, front shell 113, and back shell 116 are coupled together using one or a combination of screws, hinges, clips, other suitable fasteners, and adhesives.

The housing 110 retains componentry of the handheld computer 100. The componentry includes a main board 150, battery 151, a flexible circuit 152, and an electrostatic discharge device 154. Display 120 may be separated from housing 110 by one or more gaskets 121. Gaskets 121 absorb shock and allow a close fit between housing 110 and display 120. If display 120 is a touch-sensitive display, gaskets 121 also act as a spacer to prevent housing 110 from inadvertently activating the touch-sensitive display.

Figure 1C:
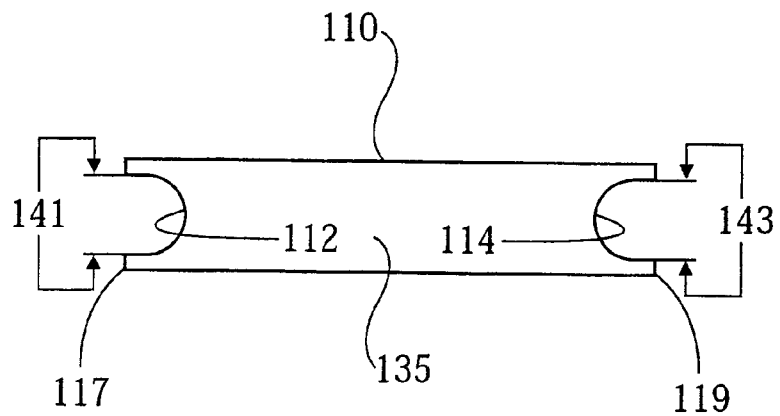

FIG. 1C illustrates a top view of the handheld computer 100. Housing 110 includes a top surface 135 having openings to the accessorial slots 112, 114. The accessorial slots 112, 114 are positioned adjacent a periphery of the housing, and preferably at the left and right lateral sides 117, 119. Each accessorial slot 112, 114 includes an open segment 141, 143 formed into the housing 110 that extends the length of the respective accessorial slot. Each open segment 141, 143 is a void formed in the housing along an arclength portion of a periphery for the respective accessorial slot 112, 114. Each open segment 141, 143 also extends lengthwise along the respective accessorial slot 112, 114 from the top end 107 to the bottom end 109 of the handheld computer. Therefore, the open segments 141, 143 of the respective accessorial slots 112, 114 access a length-wise surface of an accessorial device retained in the respective accessorial slot. Structures may be extended from or attached to the device inserted into one of the accessorial slots 112, 114 along the length accessible through the corresponding open segment 141, 143.

In this manner, accessorial slots 112, 114 allow for accessory devices such as covers 200 (FIG. 2A) to include a peripheral portion that slideably engages and couples to handheld computer 100 so as to retain structures such as a cover panel 204 (FIG. 2A). Cover panels can extend from the peripheral portions to cover surfaces on the handheld computer 100, including the display 120 and the application buttons 130. Further, the use of two or more accessorial slots 112, 114 enables the handheld computer 100 to retain an accessory device such as the cover 200 simultaneously with stylus 140.

Figure 1D:
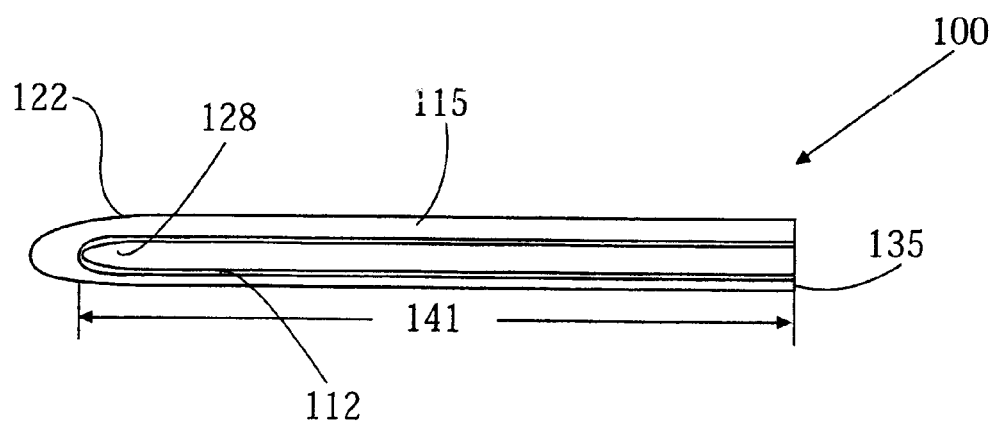

FIG. 1D is a length-wise view of one of the accessorial slot 112, 114 on the respective lateral side of the handheld computer 100. Accessorial slot 112 extends from an opening on the top surface 135 to the bottom portion 122. The accessorial slot 112 is preferably formed into the midframe 115 and includes a narrowing structure 128 positioned within or near the bottom portion 122. The narrowing structure 128 receives a tapered section of the device being inserted, which may include the stylus 140, the cover 200, or another accessory device. The open segment 141 extend the length of the accessory slot 112.

2. The Single-Cover Encasement

FIG. 2A is a frontal view of a single-cover encasement 200 that has at least one electronic component 208 embedded within the cover, under an embodiment of the invention. The cover 200 includes a spine 202 that slideably engages an opening, slot or rail of the handheld computer 100. In an embodiment such as shown by FIGS. 1A–1D, the cover 200 is slideably coupled to either one of the accessorial slots 112, 114. The cover 200 includes a cover face 204 that extends from the peripheral portion. The cover face 204 protects features of the handheld computer 100 when the peripheral portion is engaged with the opening of the handheld computer 100.

The cover face 204 extends from the spine 202 so as to cover a surface on the handheld computer 100. A flex member 206 connects spine 102 to cover face 204. The cover face 204 is moveable about an axis of the spine 202 so as to move between a position adjacent the front surface 106 and a back surface 108 of the handheld computer 200.

Spine 202 is dimensioned to be received and retained by a slot or opening in the housing 110 of the handheld computer 100. Preferably, spine 202 is an elongate member having length and cross-section to be received and retained by one of the accessorial slots 112, 114. Spine 202 includes a cylindrical cross-section having a top end 212 and a bottom end 214. A tapered segment 226 is adjacent bottom end 214. The spine 202 is inserted into one of the accessorial slots 112, 114 with the bottom end 214 first.

The tapered segment 226 of spine 202 combines with the narrowing structure 128 (FIG. 1D) of the accessorial slots 112, 114 to facilitate retention of spine 202. A protrusion 215 extends from spine 202 near top end 212. The protrusion 215 is exposed when spine 202 is inserted into the slot of the handheld computer 100 so as to enable the spine 202 to be directed out of the accessorial slot 112, 114 from the top end 212. Movement of spine 202 traverses a single longitudinal axis of the accessorial slots 112, 114 to attach the cover to and detach the cover from the handheld computer 100.

In an embodiment, spine 202 is rotationally fixed when inserted into one of the accessorial slots 112, 114. The cross-section of spine 202 may be dimensioned so that rotational movement of the spine is precluded within either one of the accessorial slot 112, 114. In another embodiment, spine 202 is rotationally moveable within the accessorial slot 112, 114. The rotation of the spine 202 may be limited to the arclength portion of the open segment 141, 143 for the accessorial slot 212, 214 receiving the spine 202.

Preferably, the spine 202 is dimensioned and contoured to be interchangeable with the stylus 140. An endpoint 227 tapered segment 226 may be structured to double as a stylus to enter input into the display 120. A stylus point may be included on the spine 202 to provide a contact with display 120 (FIG. 1A).

Flex member 206 includes a first end surface 216 extending from the spine 202 and a second end surface 218 that is attached to the cover panel 204. In an embodiment, flex member 206 extends from a length of spine 202 that is accessible through the open segment 141, 143 of the respective accessorial slots 112, 114.

Flex member 206 includes flexure properties to enable the first end surface 216 to be moved about the second end surface 218. In addition, a distance between first end surface 216 and second end surface 218 may provide a slack length to further enable movement of the second end surface 218 about the first end surface 216. Preferably, flex member 206 is formed from a plurality of segments 222 that combine to enable the first and second end surfaces 216, 218 to move about one another. The slack length and flexure properties of flex member 206 combine to permit accurate or radial movement of either the first or second end surface 216, 218 about the other end surface.

Figure 2B:
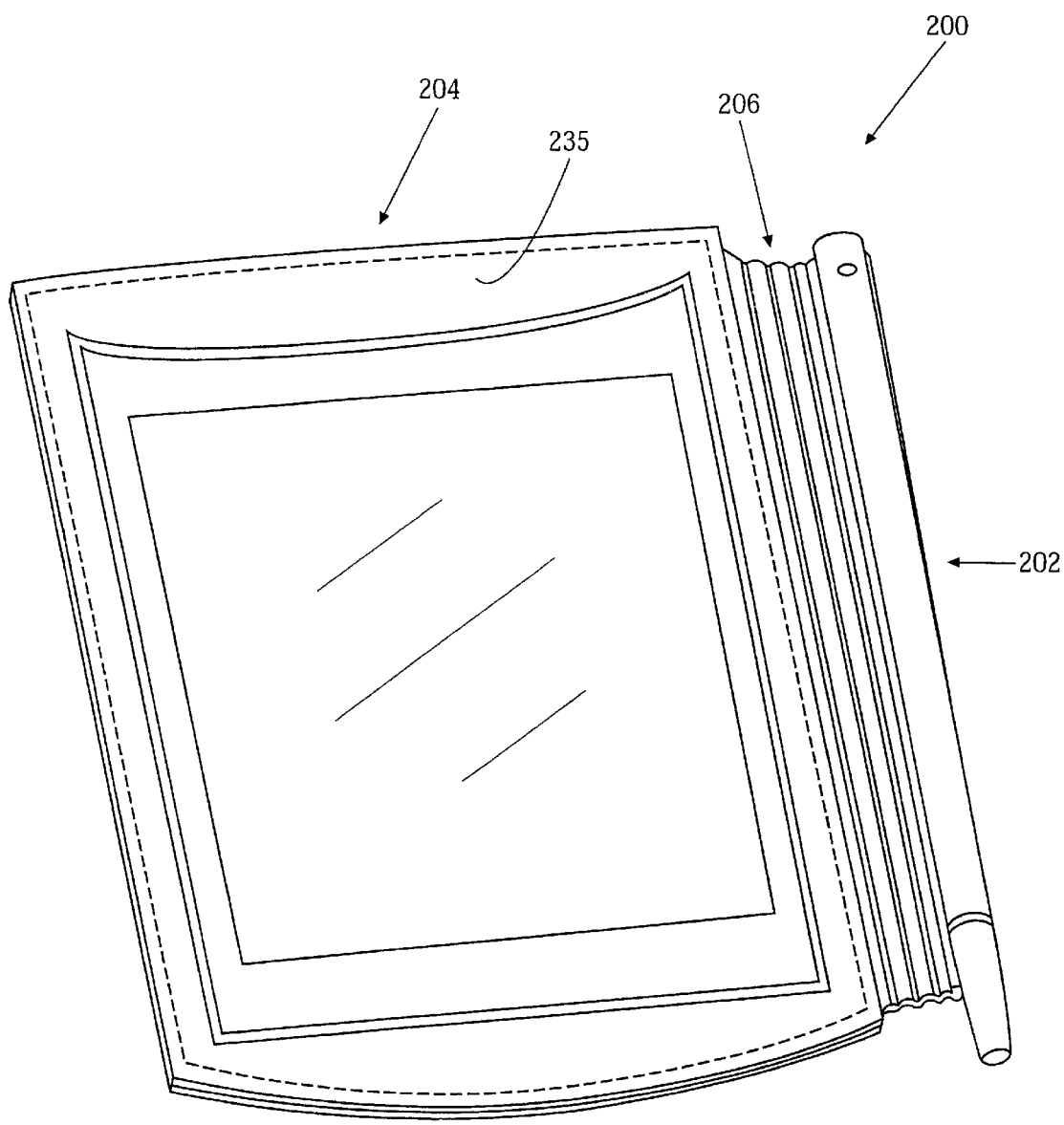

The cover panel 204 includes a first face 233 and a second face 235 (FIG. 2B). Preferably, cover panel 204 is dimensioned to cover a dimension including the display 120 (FIG. 1A) and the application buttons 130. In this way, cover panel 204 prevents inadvertent entry into the handheld computer 100 through either the display 120 or the application buttons 130. Further, components and displays of the handheld computer 200 are protected from dust, dirt, scratching, or contact.

FIG. 2B shows the second face 235 of the cover panel 204. In one embodiment, the second face 235 includes a pocket 255 to retain relatively flat items such as business cards or credit cards. The pocket 255 of the cover panel 204 is preferably formed from clear plastic portion 256 that is stitched to the second surface. Alternatively, the pocket 255 may be a unitary feature of the cover panel 204. The pocket 255 may also be joined to the second face 235 with Velcro or other detachable coupling mechanisms.

In another embodiment, the second face 235 of the cover panel 204 may include a keyboard that allows the user to enter data by tapping on the keys. The second face 235 may also include labels for the electronic components embedded in the cover 200.

Figure 2C:
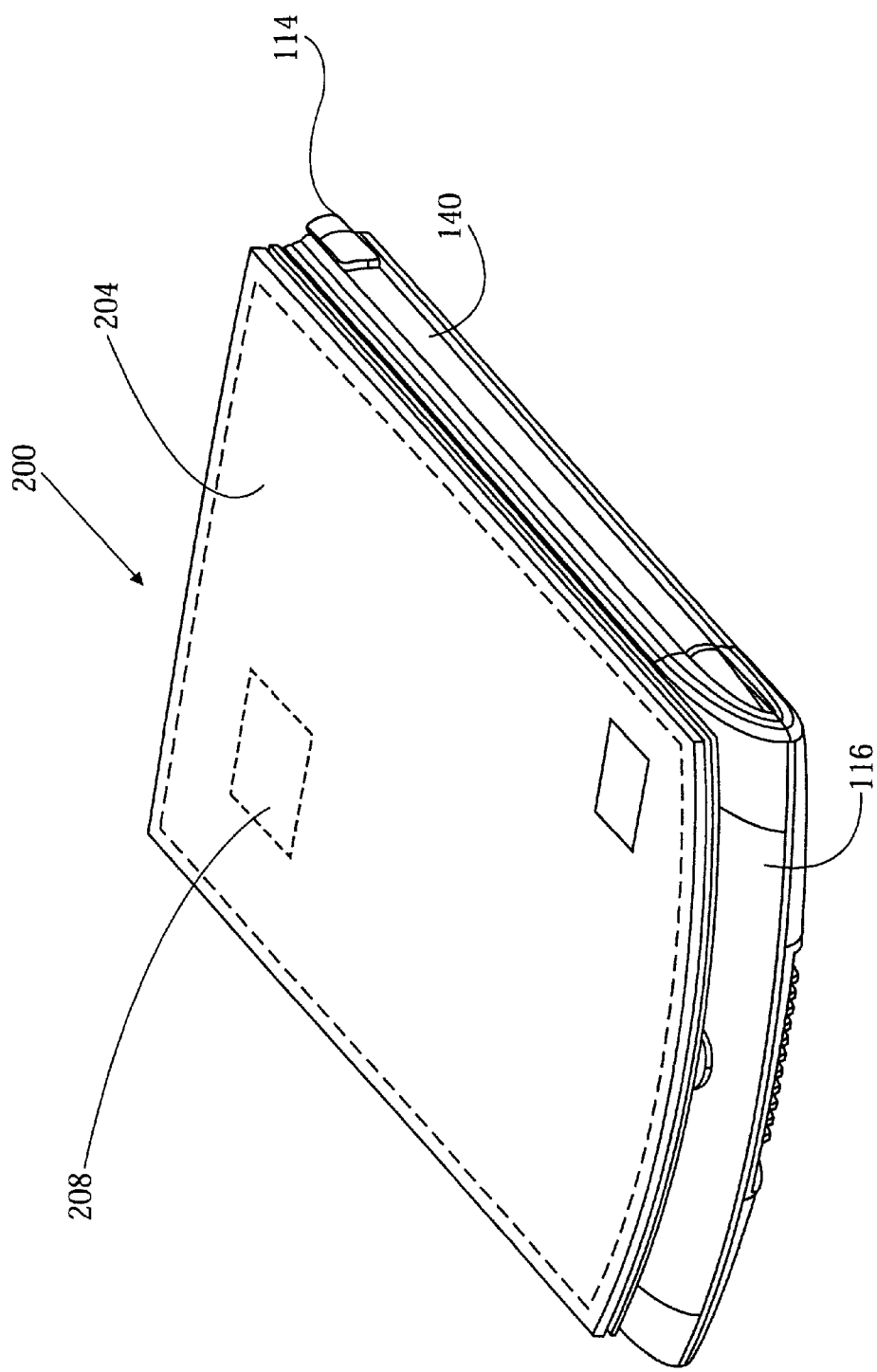

FIG. 2C illustrates the cover 200 with an electronic component 208 embedded therein in a position where cover face 204 is adjacent the front surface 116 of the handheld computer 100. The cover 200 is engaged with one of the accessorial slots 112 (not shown in this figure), and the stylus 140 is engaged with the other accessorial slot 114. In an embodiment, the cover face 204 is dimensioned so as to match almost the dimensions and contours of the front surface 106. A bottom region of the handheld computer 100 may be uncovered so as to facilitate removal of the cover face 204 from adjacent the front surface 116. The enables the cover 200 to be carried with the spine 202 with the feel of being substantially one unit.

According to the embodiment, the cover of the encasement covers the display surface of the computer. The back surface of the handheld computer, such as the one shown in FIG. 1A–D, is exposed while the front surface (i.e. the display surface) is covered. The handheld computer may include a serial connector in the back surface that can be directly connected to a communication cradle for data exchange with a PC without having the single-cover encasement removed first.

3. The Dual-Cover Encasement

Alternatively, the electronically-enabled encasement may be a dual-cover encasement. In one embodiment, the encasement may consist of two portions, a front portion that is extendable over the display surface of the handheld computer, and a back portion that is extendable over the back surface of the handheld computer.

Figure 3A:
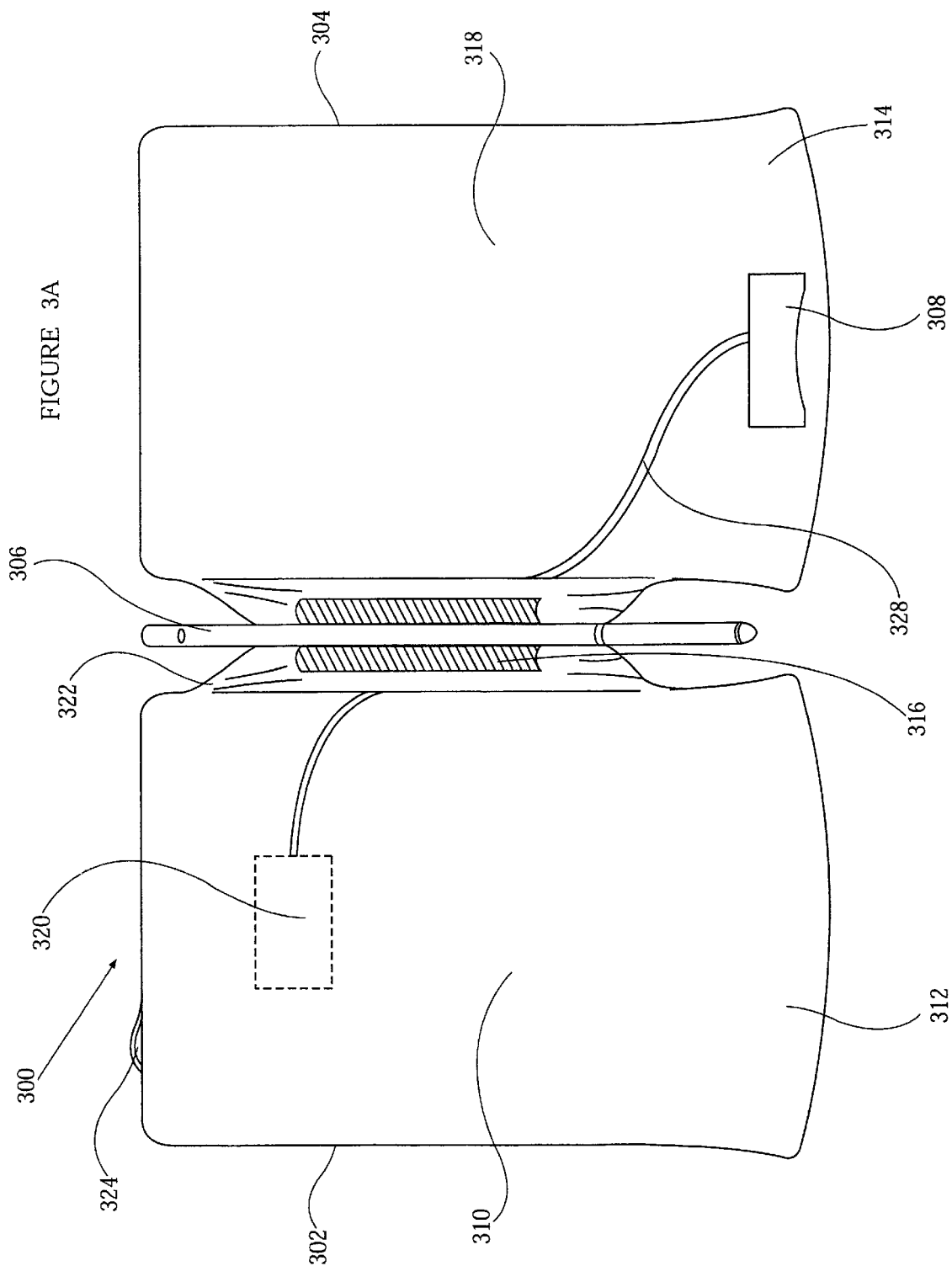
FIGS. 3A–H illustrate an encasement with and without a handheld computer encased, under an embodiment of the invention.

FIGS. 3A–G illustrates an example of an electronically-enabled encasement under this embodiment. FIG. 3A shows the encasement 300 in an opened position. The encasement 300 has a front portion 302 with its interior surface 310 shown and a back portion 304 with its interior surface 318 shown. The encasement 300 includes a joint 322 to moveably joint the front portion 302 to the back portion 304. The encasement 300 also includes a spine 306 that is coupled to the joint 322.

The spine 306 may be coupled to by various mechanisms, such as through a double hinge 316 attached to a rigid joint. The double hinge enables the back portion 304 to be moved at least 180° adjacent to the handheld computer 100. The back portion 304 may also be designed to move about 360° to let the exterior surface 314 of the back portion 304 to contact the exterior surface 312 of the front portion 302. The double hinge enables handheld computer 100 to be mated with an accessory device such as a communication cradle. For example, when front and backportion are held 180° away from handheld computer 100, handheld computer 100 can be rested on the communication cradle. The connector 326 is then accessible to a mating connector on the communication cradle. This allows the handheld computer to, for example, synchronize with another computer through the communication cradle, without detaching the encasement.

Alternatively, the spine 306 may also be adhered to the joint 322 that is formed from a flexible material such as leather or rubber. The flexible material enables the front portion 302 to wrap around the back portion 304 at any angle, preferably by swinging about 360° to let the exterior surface 314 of the back portion 304 to contact the exterior surface 312 of the front portion 302. Under this embodiment, because the back portion 304 can be wrapped around the front portion 302, a handheld computer encased by such an encasement 300 may be directly connected to a communication cradle through a connector in the back surface of the computer without having the encasement 300 removed first.

The electronic component 320 may be embedded in any portion of the encasement, preferably in the front portion 302 of the encasement 300. The electronic component may be a wide variety of electronic peripherals such as wireless modems, radio transmitters, voice recorders, digital cameras, keyboards, cell phones, solar cells, rechargeable batteries, GPS systems, rechargers, memories, connectors for multi-media cards, memory sticks, accessory cartridges, compact flash cards and phone cards. Additional batteries may be included to prolong the operational life of a handheld computer. A radio antenna 324 may also be included in the front portion 302 of the encasement 300 to facilitate RF-mediated wireless communications.

In another embodiment, the back portion 304 of the encasement 300 may include an opening 308 to allow access of a connector through the opening 308 to a handheld computer encased therein. For example, a serial connector may be inserted into the opening 308 to connect with another serial connector of the handheld computer to facilitate data exchange with another computing or telecommunication device. The serial connector may be a component of the communication cradle.

Alternatively, a connector may be installed in the opening 308. The connector is capable of mating with a serial connector of the handheld computer. A flexible cable 328 may be used to connect the connector in the back portion 304 with the electronic component in the front portion 302. Through these two connectors located in the encasement and the handheld computer, respectively, and the circuitry 328, the communication between the electronic component and the handheld computer is facilitated.

Optionally, the encasement 300 may further comprise a locking mechanism (not shown). The locking mechanism couples the back portion 304 of the encasement 300 with the handheld computer to secure stable mating between the connector in the encasement 300 and the serial connector of the handheld computer.

Figure 3B:
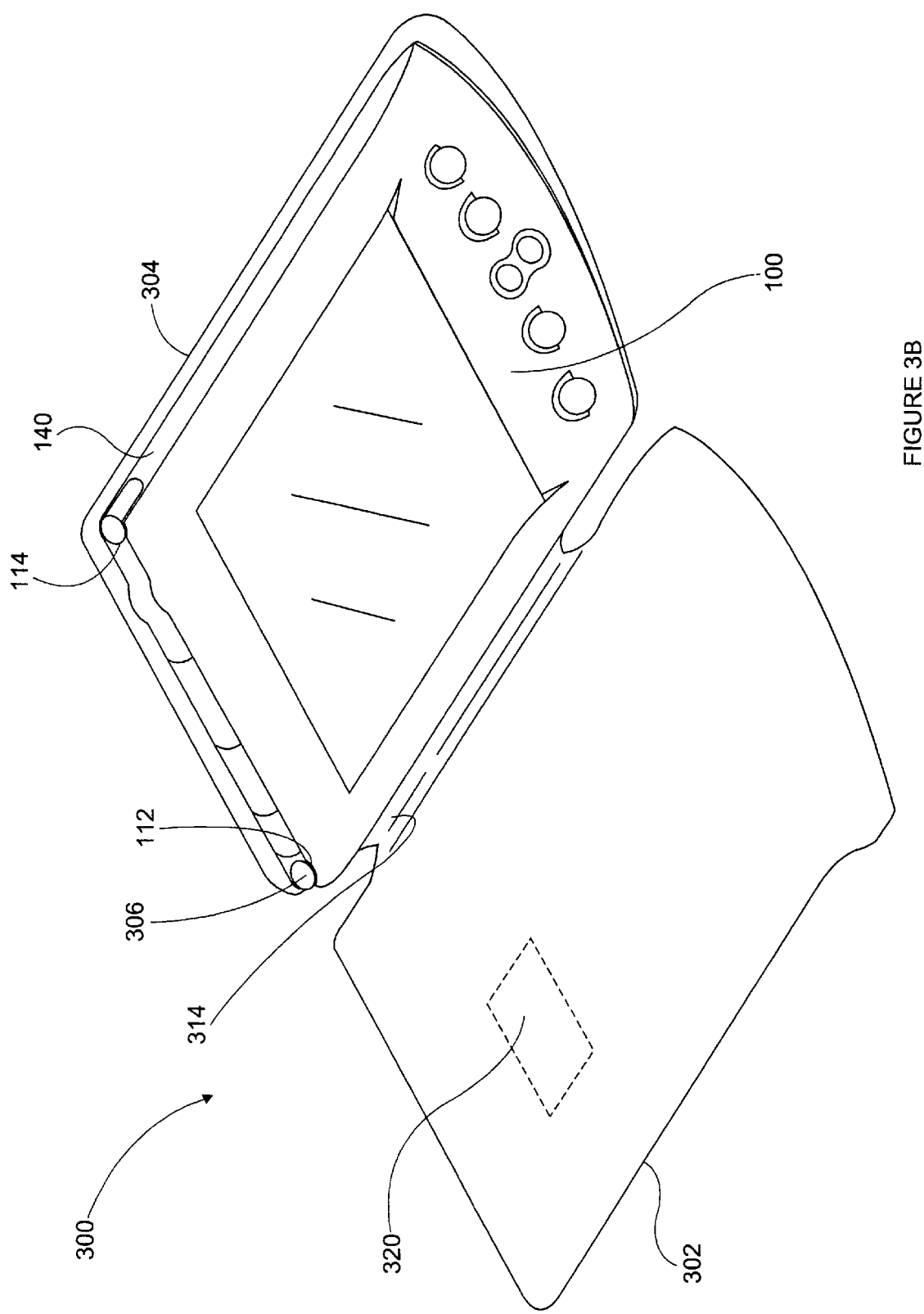

FIG. 3B shows the encasement 300 encasing handheld computer 100 illustrated in FIGS. 1A–D, encased in therein. The handheld computer 100 is engaged with the encasement by the spine 306 of the encasement 300 through accessorial slot 112. A stylus 140 for data input may be coupled to another accessorial slot 114 of the handheld computer.

Figure 3C:
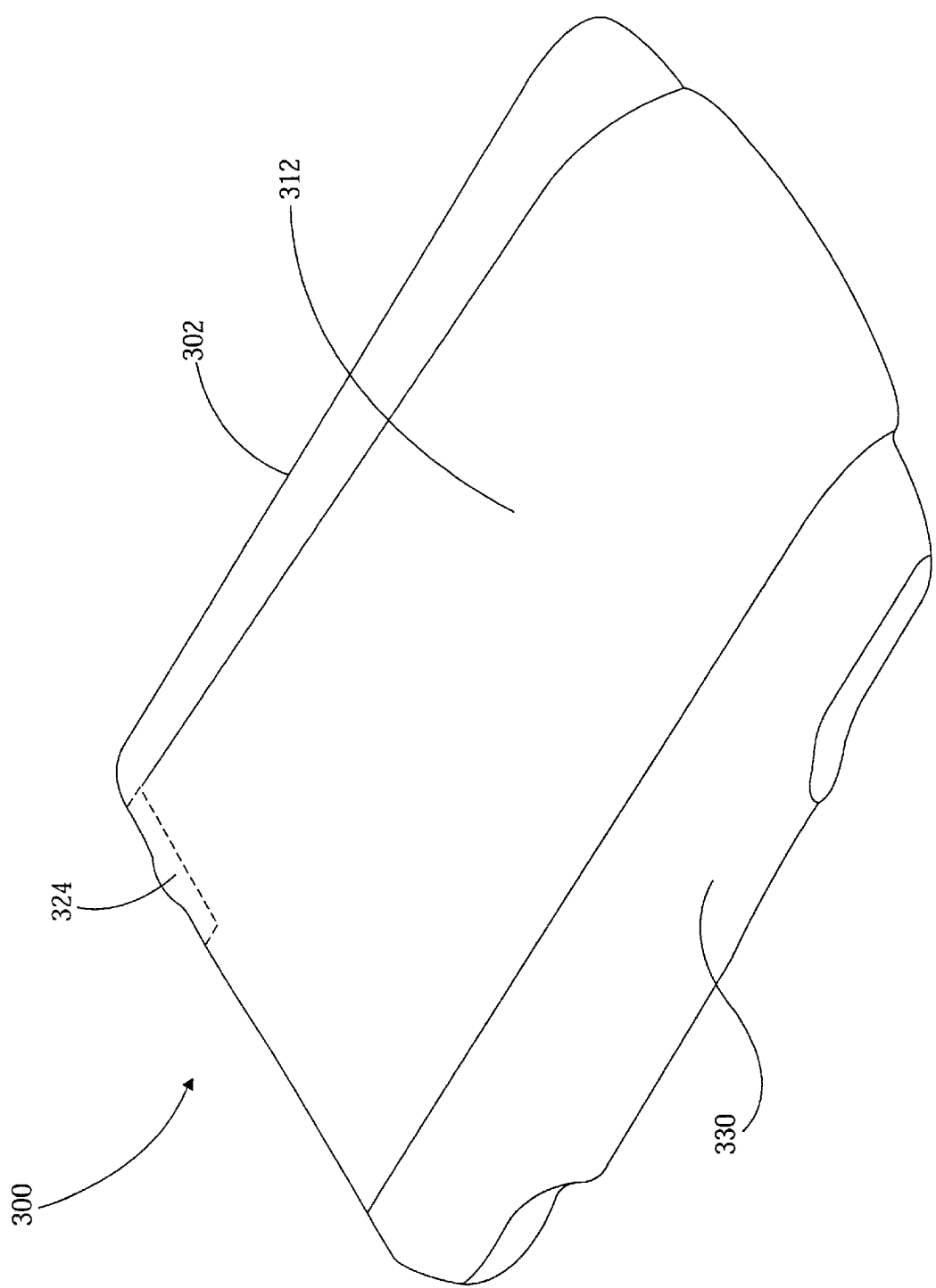

FIG. 3C is the frontal view of the encasement in the closed position. The exterior surface 312 of the encasement 300 may preferably have a contour with a compact and sleek shape. The encasement 300 may also have a portion 330 covering the spine 306 (not shown) within. A radio antenna 324 is also shown be included in the front portion 302.

Figure 3D:
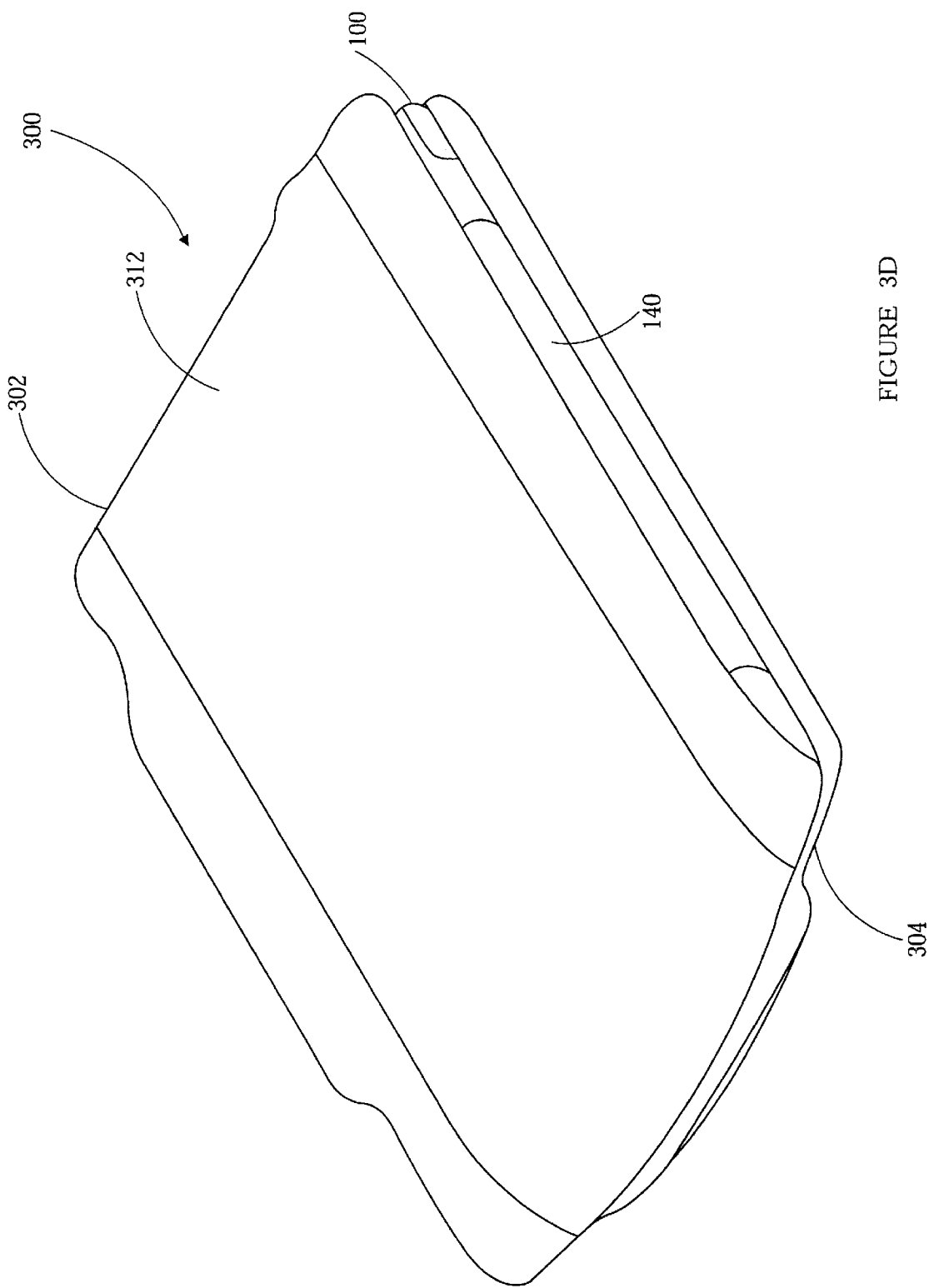

FIG. 3D is a side-view of the encasement 300 in the closed position that encases a handheld computer 100. As illustrated in FIG. 3D, both the front portion 302 and back portion 304 are dimensioned so as to substantially match the dimensions and contours of the front and back surfaces (not shown) of the handheld computer 100. The stylus 140 is coupled to the accessorial slot 114 (shown in FIG. 3B). This assembly enables the encasement 300 encasing the handheld 100 to be carried with a feel of being substantially one unit.

Optionally, the encasement 300 may further comprise a mechanical coupling (not shown) that enables the front portion and the back portion to be retained in a closed position. The mechanical coupling may be any kind of coupling mechanism available in the art, such as a male velcro element positioned on the front or the back portion and a female velcro element positioned on the other of the front and the back portions.

Figure 3E:
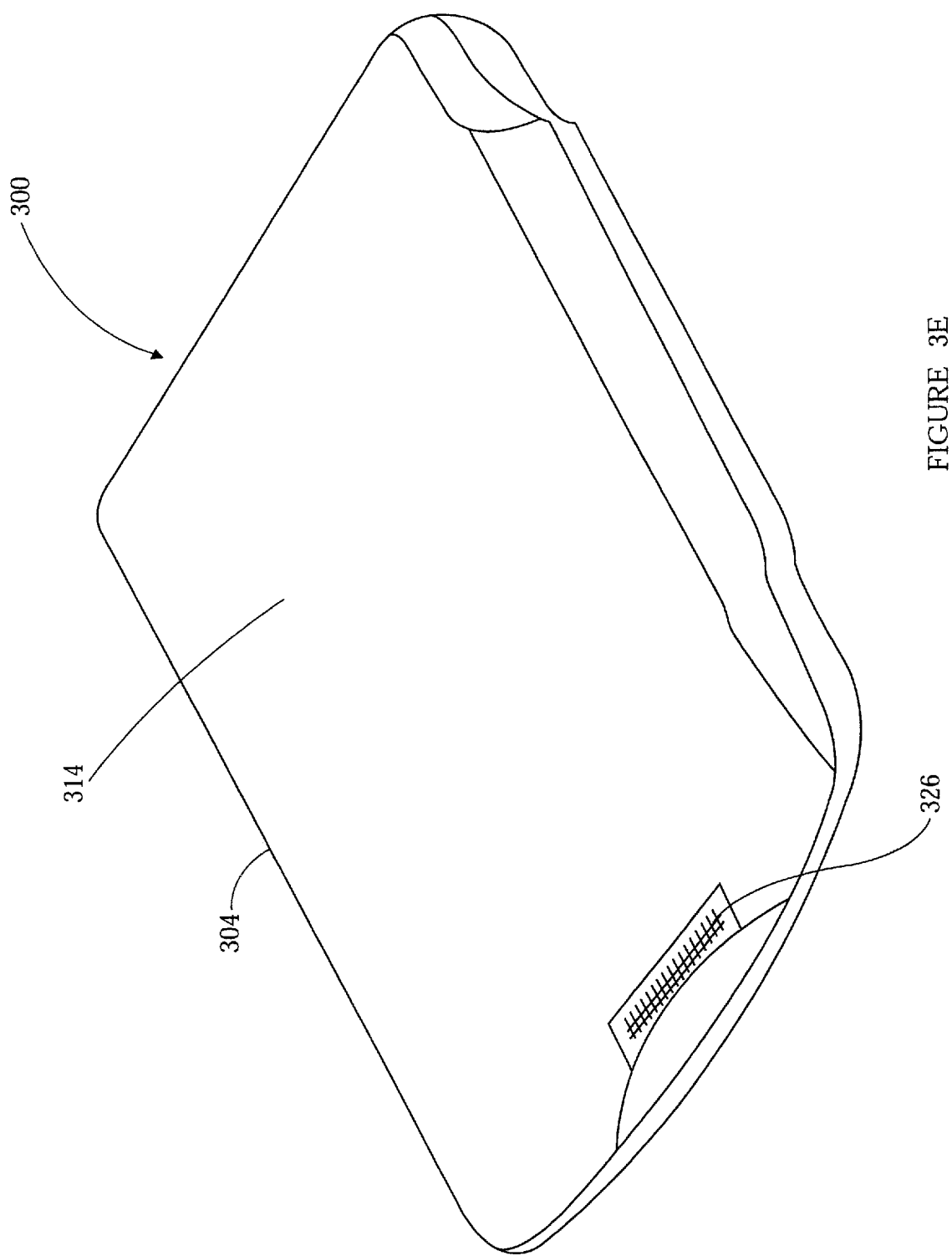

FIG. 3E is a rear view of the encasement 300 in the closed position. The back portion 304 of the encasement 300 may optionally include two connectors, one located on the interior surface of the back portion 304 (not shown) and the other connector 326 located on the exterior surface 314 of the back portion 304. The connector inside is capable of mating with a serial connector on the handheld computer while the outside connector 326 is capable of mating with another connector of an accessory device such as a communication cradle. This connection enables the handheld computer to synchronize with another computer when the encasement is coupled to the handheld computer. For example, the encasement 300 having such a connector 326 in the back portion 304 may be coupled to another connector on a communication cradle to facilitate data transfer between the encased handheld computer and a PC, without having the encasement electronically or physically decoupled from the handheld computer first.

Under this embodiment, the encasement 300 may also include a processor capable of executing synchronization functions.

Figure 3F:
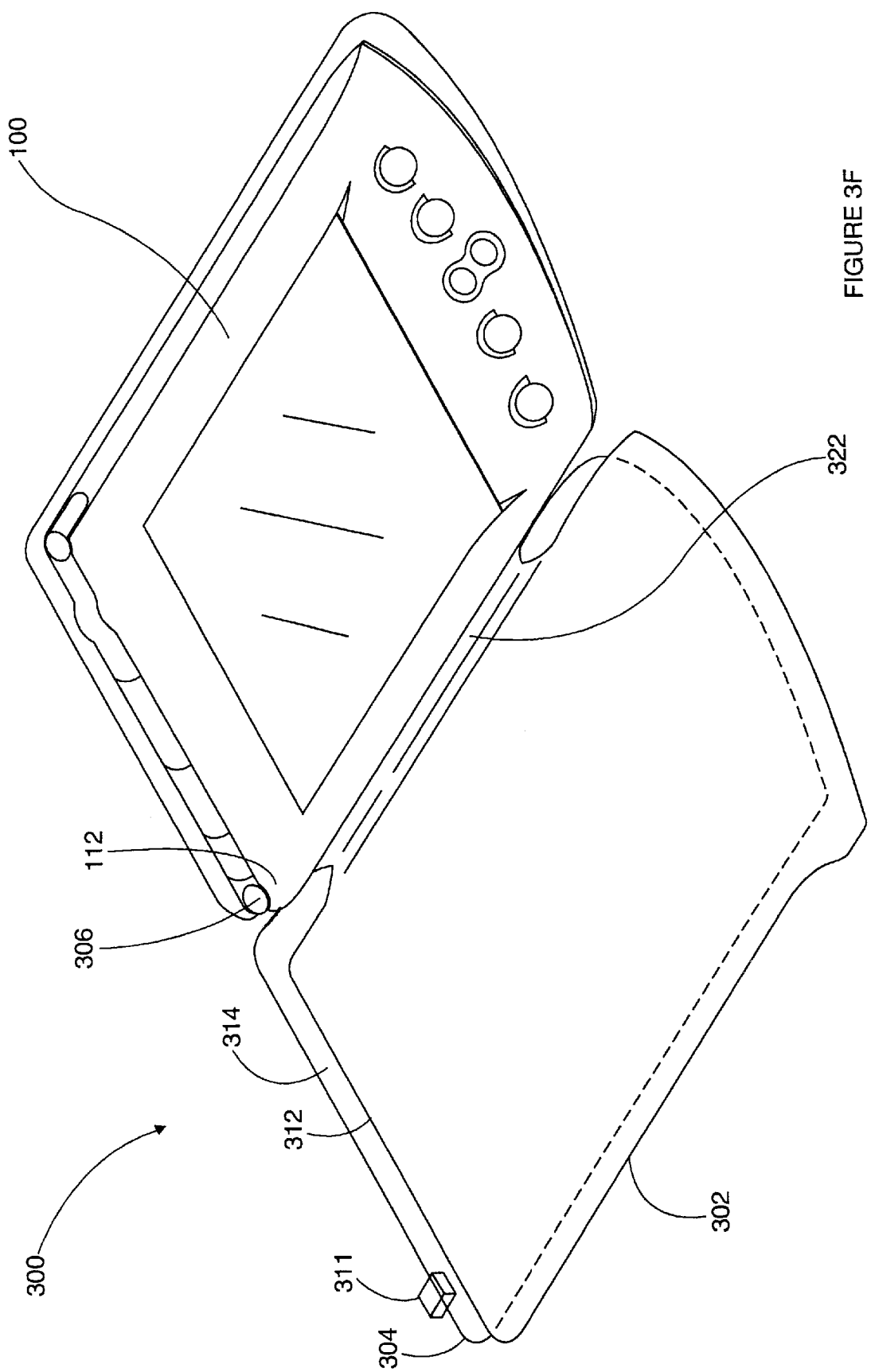

Alternatively, the encased handheld computer may be directly connected via its serial connector to any accessory device without having the encasement decoupled first. As illustrated in FIG. 3F, the encasement 300 is engaged with the handheld computer 100 through the spine 306 on the joint 322 of the encasement 300.

The joint 322 may be a double-hinge or a joint formed from a flexible material such as leather or rubber. The double hinge or the flexible material enables the back portion 304 to be moved at least 180° adjacent to the handheld computer 100. The back portion 304 may also be designed to move about 360° to let the exterior surface 314 of the back portion 304 to contact the exterior surface 312 of the front portion 302. Under either embodiment, because the back portion 304 can be moved relative to the front portion 302, a handheld computer encased by such an encasement 300 may be directly connected to a communication cradle through a connector in the back surface of the computer without having the encasement 300 decoupled from the handheld computer.

In an embodiment such as shown, an antenna 311 may be electronically coupled to the component 320 of the encasement. The antenna 311 may enable wireless communications, including transmission and reception of radio-frequency signals. For example, the encasement may be Bluetooth enabled, and antenna 311 transmits and receives RF signals in a Bluetooth protocol. Alternatively, antenna 311 may be an integral feature of the encasement. A wide variety of connectors may be used to extend communication of handheld computer to the electronic component in the encasement. Examples of connectors may include, but are not limited to, wiping style connectors, pogo style connectors and dual style connectors. Detailed description of these connectors is in U.S. patent application Ser. No. 09/318,886 entitled "Dual Style Connector for Handheld Computer" which is hereby incorporated by reference in its entirety.

Figure 3G:
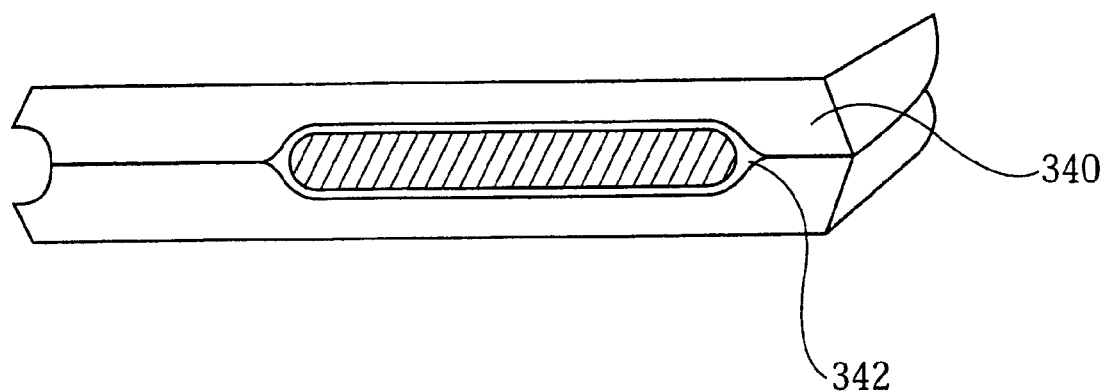

FIG. 3G is a top view showing a top surface 340 of the encasement 300. The top surface 340 includes an opening 342. In an embodiment, opening 342 is positioned to allow access to a data port of the handheld computer. Preferably, the opening 342 is positioned to provide access to a wireless port of the handheld computer 100. For example, the opening 342 is positioned to provide access to an infra-red port of the handheld computer 100. Thus, handheld computer 100 can receive wireless signals from other devices even when housed within encasement 300. This provides convenience to users, who can receive, for example, electronically transmitted business cards from other devices without having to decouple the handheld computer 100 from the encasement 300.

Alternatively, opening 342 can be used to allow radio-frequency communications to pass through and be received by the handheld computer.

Figure 3H:
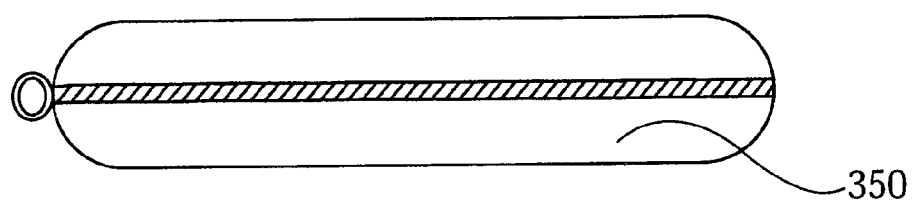

FIG. 3H illustrates a bottom surface 350 of the encasement 300. The contours of the bottom surface 350 match the contours on the handheld computer 100.

4. Wireless-Communication-Enabled Encasement

Embodiments of the invention also include an encasement that has at least one wireless communication port embedded therein. In this embodiment, the encasement comprises one or more wireless communication ports, such as an RF-port and an IR port. Such an encasement allows wireless communication of the handheld computer encased with a wide range of computing and telecommunications devices. This mode of communication eliminates the need to buy, carry or connect cables which can become costly and cumbersome. The wireless communication delivers opportunities for rapid connections, and possibly for automatic, unconscious connections between the handheld computer and the other devices.

Examples of the devices that can communicate with the handheld computer include, but are not limited to, 1) Notebook, desktop, and handheld computers; 2) Phones and pagers; 3) Modems; 4) Printers; 5) Cameras; 6) network servers such as WAN and LAN access devices; 7) Medical and industrial equipment; and 9) Watches.

In an embodiment, the RF port is Bluetooth-enabled. Bluetooth is a Radio Frequency (RF) specification for short-range, point-to-multipoint data transfer. Bluetooth can transmit through solid, non-metal objects. Its nominal link range is from 10 cm to 10 m, but can be extended to 100 m by increasing the transmit power. It is based on a low-cost, short-range radio link, and facilitates ad hoc connections for stationary and mobile communication environments.

Bluetooth Operates in the 2.4 GHz Industrial-Scientific-Medical (ISM) band. It Uses Frequence Hop (FH) spread spectrum, which divides the frequency band into a number of hop channels. During a connection, radio transceivers hop from one channel to another in a pseudo-random fashion. It can support multiple devices in a piconet (two or more Bluetooth units sharing a channel).

One of the advantages of using Bluetooth wireless communication is that it possesses a built-in security. It facilitates non-line-of-sight transmission through walls and briefcases in an omni-directional manner. It also supports both isochronous and asynchronous services and thus allows easy integration of TCP/IP for networking. Further, it is regulated by governments worldwide and therefore allows universal interoperatability between hardware ports.

In addition, by installing the RF antenna in the encasement, instead of in the handheld computer itself, there is less interference with the RF signal. When the front cover of the encasement is open, the RF antenna is standing high and away from the handheld computer. With the antenna in this position, the RF signal is less interfered by the circuitry and metal components of the handheld computer, thus allowing clearer and better transmission and reception.

In another embodiment, the encasement comprises an IR port to allow wireless communication between the handheld computer encased and a wide range of computing and telecommunications devices.

The Infrared Data Association (IrDA) specifies three infrared communication standards: IrDA-Data, IrDA-Control, and AIr. In general, IrDA-Data is used to provide wireless connectivity technologies for devices that would normally use cables for connectivity. IrDA is a point-to-point, narrow angle (30f cone), ad-hoc data transmission standard designed to operate over a distance of 0 to 1 meter and at speeds of 9600 bps to 16 Mbps.

By using an IR port in the encasement of the present invention, the encased handheld computer can communicate with a worldwide installed base of over 150 million units which is growing at 40% annually. Since IrDA is widely available on personal computers, peripherals, embedded systems and devices of all types, the encased handheld computer serves a convenient tool for data transferring between these devices. In addition, the wide use and acceptance of IrDA standards and robust solutions have accelerated adoption of the IrDA specifications by other standards organizations. Such universal adoption and world-wide implementation of IrDA specifications promotes use of a universal hardware port and rapidly emerging software interoperability, thereby facilitating efficient and economic world-wide communication.

The encasement may further comprise an RF port for dual-purposes wireless communication depending on the situation of the user. For example, the user attempts to synchronize information between his/her handheld computer and a PC in a room containing a number of other devices. The user may choose to use the mode of IR wireless communication. The short-range, narrow angle of an IR port allows the user to aim, in a point-and-shoot style at the intended PC in Close proximity. The limited range and angle of IrDA allows other users in the same room to be performing a similar activity without interference. The short-range and narrow angle of the IR port provides a simple form of security and a natural ease of use.

Alternatively, in other data exchange situations the user may choose Bluetooth RF mode of wireless communication. Bluetooth's ability to penetrate solid objects and its capability for maximum mobility within the piconet allows for data exchange applications that are very difficult or impossible with an IR port. For example, with Bluetooth the user could synchronize his/her handheld computer with a remote PC via a Bluetooth-enabled cellular phone without taking the phone out of their pocket or purse. The omni-directional capability of Bluetooth also allows synchronization to start when the handheld computer is brought into range of a Bluetooth-enabled PC or device. Further, using Bluetooth for synchronization does not require that the handheld computer remain in a fixed location. If the handheld computer is carried in the person's pocket, the synchronization can occur while the person moves around.

Both Bluetooth and IR ports have the ability to wirelessly connect a device to a wired network. In particular, because there are no line-of-sight requirements for Bluetooth devices, Users of the handheld computer with a Bluetooth enabled encasement can have a higher level of flexibility than an IR port when placing a LAN access point within the premises. Further, Bluetooth's multipoint capability allows multiple devices including multiple handheld computers to efficiently share the media. Moreover, when the user needs to establish a dial-up connection to the Internet, the user can leave the handheld computer in his/her pocket and walk around for the entire dial-up connection. In addition, using a Bluetooth-enabled encasement for a handheld computer is advantageous in Voice Applications. A native feature of the Bluetooth specification is synchronous voice channels. Bluetooth has the ability to reserve bandwidth for carrying digital voice data. Bluetooth may support as many as three simultaneous, full duplex voice conversations within a piconet.

Figure 4:
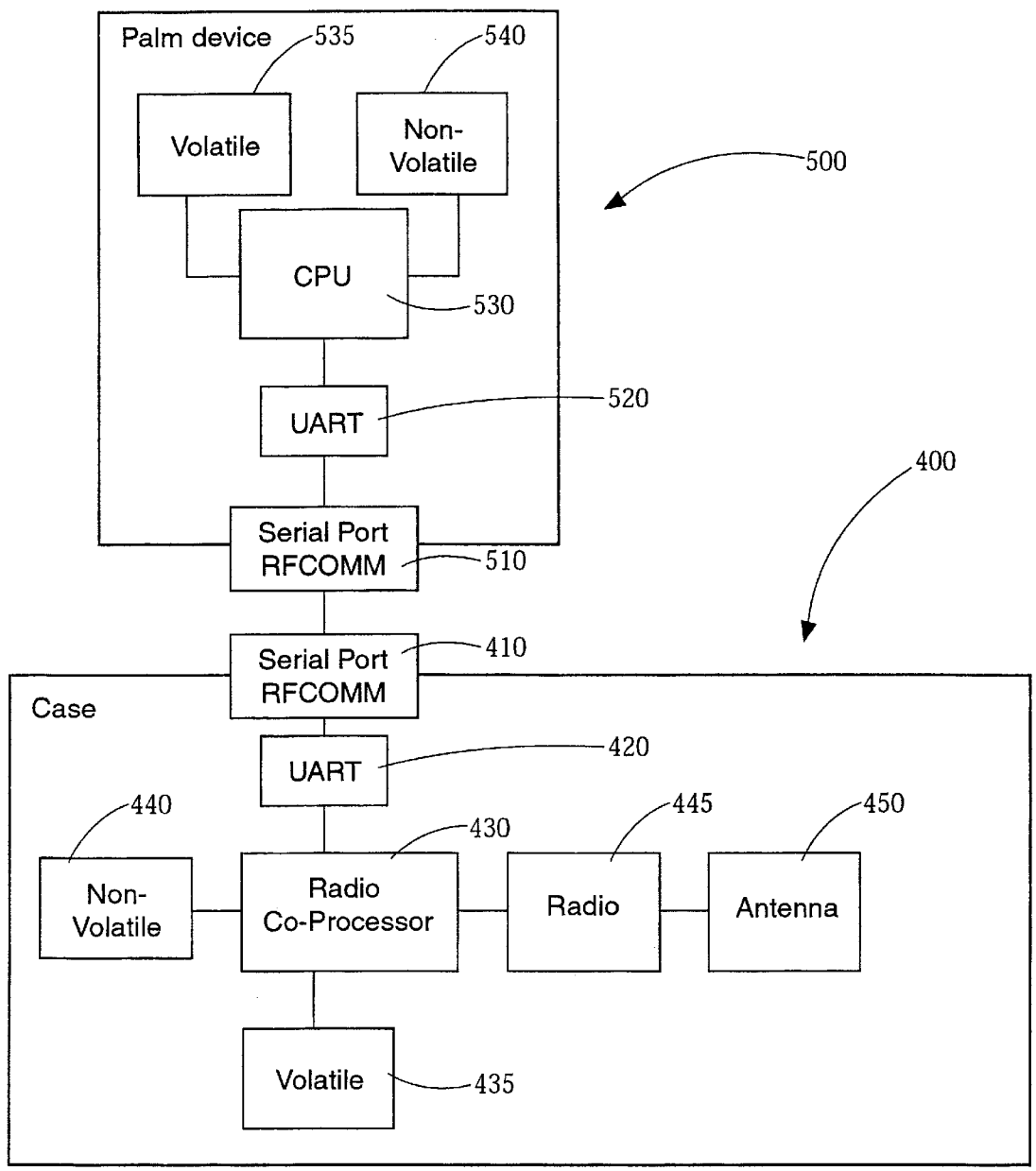
FIG. 4 illustrates an example of RF-enabled wireless communication between the encasement of present invention and a handheld computer.

FIG. 4 illustrates a system comprising handheld computer 500, and an RF encasement 400, under an embodiment of the invention. The RF encasement 400 includes a serial port 410, a universal asynchronous receiver/transmitter (UART) 420, a processor 440, radio 445, and antenna 450. The antenna 450 receives or transmits RF communications. The radio 445 converts incoming radio data to bit form for processor 440. The radio 445 may also convert outgoing bit data from processor 440 to radio forms. The processor converts the bit data to one or more protocols. In particular, Bluetooth communication uses several real time protocols. The processor 440 converts the bit data into protocols for Bluetooth communications. The processor 440 also includes volatile memory 430 and non-volatile memory 440 for data storage and conversion.

The UART 420 converts the bit data for a serial communication transfer. The serial port 410 signals the serial communication to handheld computer 100. The serial port 410 may correspond to connector 326, or alternatively, to another connector. The serial port 410 may also correspond to an IR port, or another wireless port.

In a system such as shown by FIG. 4, handheld computer 100 includes serial port 510 to receive and/or transmit serial communications. The UART 520 converts processor data to serial form. A volatile and non-volatile memory 535, 540 on handheld computer 500 store data for processor 530. In this way, processor 530 communicates with RF encasement 400.

CONCLUSION

The foregoing description of various embodiments of the invention has been presented for purposes of illustration and description. It is not intended to limit the invention to the precise forms disclosed. Many modifications and equivalent arrangements will be apparent.

What is claimed is:

1. An electronically-enabled encasement for a handheld computer, the encasement comprising:
    an encasement portion configured to cover at least a portion of the handheld computer, including a front surface of the handheld computer providing access to a display;
    a spine engageable with an accessory slot of the handheld computer to couple the encasement with the handheld computer and to detach the encasement from the handheld computer; and
    at least one electronic component embedded in the encasement portion so as to be external to the handheld computer when the spine is engaged with the accessory slot of the handheld computer.

2. The encasement of claim 1, wherein the spine is slideably engageable with an accessory slot of the handheld computer, the encasement portion being dimensioned to encase the handheld computer when the spine is engaged to the handheld computer.

3. The encasement of claim 1, wherein the component includes a connector capable of mating with a serial connector of the handheld computer to allow communication between the electronic component and the handheld computer.

4. The encasement of claim 1, wherein the encasement portion comprises a front portion that is extendable over the display surface of the handheld computer, and a back portion that is extendable over the back surface of the handheld computer.

5. The encasement of claim 1, wherein the electronic component is selected from the group consisting of wireless modem, voice recorder, digital camera, keyboard, cell phone, solar cell, rechargeable battery, GPS system, recharger, memory, connector for multi-media cards, memory stick, accessory cartridge, compact flash card and phone card.

6. The encasement of claim 1, further comprising one or more batteries.

7. The encasement of claim 1, wherein the encasement includes a radio frequency communication component.

8. The encasement of claim 1, wherein the component includes a memory that can be accessed by the handheld computer.

9. The encasement of claim 3, wherein the connector is selected from the group consisting of a wiping-style connector, a pogo-style connector and a dual style connector.

10. The encasement of claim 3, further comprising circuitry in the encasement that connects the connector to the electronic component of the handheld computer.

11. The encasement of claim 4, further comprising a joint to movably couple the front portion to the back portion.

12. The encasement of claim 4, wherein the joint is formed from a flexible material.

13. The encasement of claim 4, wherein the electronic component is embedded in the front portion of the encasement portion.

14. The encasement of claim 7, wherein the radio frequency communication component is adapted to operate in a Bluetooth medium.

15. The encasement of claim 7, further comprising an RF antenna.

16. The encasement of claim 8, wherein the memory stores information for the handheld computer.

17. The encasement of claim 12, wherein the flexible material enables the front portion to wrap around and allow the exterior surface of the front portion to contact an exterior surface of the back portion.

18. The encasement of claim 13, wherein the encasement further comprises a connector that is embedded in the back portion of the encasement and is capable of mating with a serial connector of the handheld computer to extend communication of the handheld computer to the electronic component.

19. The encasement of claim 17, wherein the joint is a wrap-around hinge that enables the front portion to wrap around the back portion.

20. The encasement of claim 18, further comprising a second connector accessible from an exterior surface of the back portion of the encasement, the second connector being position to mate with another connector of an accessory device while the first connector is mated with the serial connector of the handheld computer.

21. The encasement of claim 20, wherein the second connector enables the handheld computer to synchronize with another computer when the encasement is coupled to the handheld computer.

22. The encasement of claim 21, further comprising a processor embedded in the encasement, the processor being capable of executing synchronization functions.

23. An electronically-enabled encasement for a handheld computer, the encasement comprising:

an encasement portion configured to cover at least a portion of the handheld computer, including a front surface of the handheld computer providing access to a display, the encasement portion comprising a front portion that is extendable over the display surface of the handheld computer, and a back portion that is extendable over the back surface of the handheld computer;

a spine engageable with an accessory slot of the handheld computer to detachably couple the encasement with the handheld computer; and at least one electronic component embedded in the front portion of the encasement portion;

a connector that is embedded in the back portion of the encasement and is capable of mating with a serial connector of the handheld computer to extend communications from the handheld computer to the electrical component; and a locking mechanism, the locking mechanism coupling the back portion of the encasement portion with the handheld computer to secure stable mating between the connector in the encasement and the serial connector of the handheld computer.

24. An electronically-enabled encasement for a handheld computer, the encasement comprising:

an encasement portion configured to cover at least a portion of the handheld computer, including a front surface of the handheld computer providing access to a display, the encasement portion comprising a front portion that is extendable over the display surface of the handheld computer, and a back portion that is extendable over the back surface of the handheld computer;

a spine engageable with an accessory slot of the handheld computer to detachably couple the encasement with the handheld computer;

at least one electronic component embedded in the encasement portion; and a mechanical coupling that enables the front portion and the back portion to be retained in a closed position.

25. The encasement of claim 24, wherein the mechanical coupling, is a male velcro element positioned on the front or the back portion and a female velcro element positioned on the other of the front and the back portions.

26. An electronically-enabled encasement for a handheld computer, the encasement comprising:

an encasement portion configured to cover at least a portion of the handheld computer, including a front surface of the handheld computer providing access to a display and a back surface;

a spine engageable with an accessory slot of the handheld computer to couple the encasement with the handheld computer;

a radio frequency mechanism integrated into the encasement portion; and an electrical coupling positioned on a surface of the encasement portion to electrically couple the radio frequency mechanism and the handheld computer when the spine is engaged with the accessory slot;

wherein the spine is engageable with the accessory slot to detach the encasement from the handheld computer so that the radio frequency mechanism is electrically decoupled from the handheld computer.

27. The encasement of claim 26, further including an RF antenna embedded in the encasement portion.

28. An electronically-enabled encasement for a handheld computer, the encasement comprising:

an encasement portion configured to cover at least a portion of the handheld computer;

a communication port on the encasement that extends communications through another communication port of the handheld computer to the handheld computer; and a cable embedded in the encasement that connects the communication port on the encasement to the communication port on the handheld computer.

29. The encasement of claim 28, further comprising a coupling engageable with the handheld computer to detachably couple the encasement with the handheld computer.

30. The encasement of claim 28, wherein the second communication port is a serial connector, and wherein the first communication port is a connector configured to mate with the serial connector of the handheld computer to extend communication to the handheld computer.

31. The encasement of claim 29, wherein the encasement portion comprises a front portion that extends over the display surface of the handheld computer, and a back portion that extends over the back surface of the handheld computer.

32. The encasement of claim 28, wherein the first communication port is an infrared port or a radio frequency port.

33. The encasement of claim 28, further comprising at least one electronic component embedded in the encasement portion.

34. The encasement of claim 29, wherein the coupling includes a spine, the spine being engageable with an accessory slot of the handheld computer to detachable couple the encasement to the handheld computer.

35. The encasement of claim 29, wherein the coupling snugly fits the handheld computer with the encasement.

36. The encasement of claim 31, further comprising a joint to moveably couple the front portion to the back portion.

37. The encasement of claim 33, wherein the electronic component is selected from the group consisting of wireless modem, voice recorder, digital camera, keyboard, cell phone, solar cell, rechargeable battery, GPS system, battery recharger, memory, connector for multi-media cards, memory stick, accessory cartridge, compact flash card and phone card.

38. The encasement of claim 33, wherein the first communication port is a first serial connector, and wherein the second communication port is a second serial port.

* * * * *

UNITED STATES PATENT AND TRADEMARK OFFICE
CERTIFICATE OF CORRECTION

PATENT NO.    : 6,356,442 B1
DATED         : March 12, 2001
INVENTOR(S)   : E. Michael Lunsford It is certified that error appears in the above-identified patent and that said Letters Patent is hereby corrected as shown below:

Column 16,
Line 61, replace "claim 29" with -- claim 28 --.

Signed and Sealed this

Twenty-seventh Day of August, 2002

Attest:

Attesting Officer

JAMES E. ROGAN
Director of the United States Patent and Trademark Office